United States Patent [19]

Itoh

[11] Patent Number: 6,042,739
[45] Date of Patent: Mar. 28, 2000

[54] ETCHANT AND METHOD FOR ETCHING CHALCOGENIDE GLASS AND OPTICAL MEMBER HAVING SMOOTH SURFACE

[75] Inventor: Katsuhisa Itoh, Tokyo, Japan

[73] Assignee: Hoya Corporation, Tokyo, Japan

[21] Appl. No.: 08/994,935

[22] Filed: Dec. 19, 1997

[30] Foreign Application Priority Data

Dec. 20, 1996 [JP] Japan ................................ 8-341977

[51] Int. Cl.$^7$ .................................................. B44C 01/02
[52] U.S. Cl. ................................... 216/96; 216/88; 216/90
[58] Field of Search ................................ 216/88, 89, 90, 216/96

[56] References Cited

U.S. PATENT DOCUMENTS

| | | | |
|---|---|---|---|
| 3,956,042 | 5/1976 | Thornburg et al. | 156/3 |
| 4,154,503 | 5/1979 | Lettington et al. | |
| 4,631,114 | 12/1986 | Schneider | 156/663 |
| 4,678,275 | 7/1987 | Ikedo et al. | |
| 4,696,717 | 9/1987 | Bissinger . | |
| 5,445,706 | 8/1995 | Okano et al. | 156/637.1 |

FOREIGN PATENT DOCUMENTS

| | | |
|---|---|---|
| 854119 | 7/1998 | European Pat. Off. . |
| XP-002077802 | 2/1980 | Japan . |
| XP-002077801 | 11/1993 | Japan . |

OTHER PUBLICATIONS

"Increased Amplitude—Phase Contrast on Layers of Glassy Chalcogenide Semiconductors After Additional Chemical Treatment", Turyanitsa et al.; abstract only; 1979; Izy. Vyssh. Uchetn. Zaved, Fiz., 22(6).

"Electrophysical and Mass Spectrometric Studies of The Real Surface of Zinc Chalcogenide Single Crystals"; Kirovskaya et al.; Vses, Simps, Elektron, Postsessam Poverkhn. Poluprovodn. Granitse Razdela Poluprovodn,—Dielektr. (Mater), 7th (1980), vol. 2, p. 278—(abstract only).

"Metallographic Determination of the Homogenilty of Vitreous Materials",—Hruby et al.; Cesk. Cas. Eys. (1973), 23(6), abstract only.

"Kinetics of Etching of Ag 0.2 Geo.3.0.5 and Ag 0.7 AsSe Glasses In Acidie Oxidative Media"; Shkolinikov et. al.; 1995—abstract only; Fiz, Khim. Stekla 21(1).

European Search Report Date of Completion: Sep. 17, 1998.

*Primary Examiner*—Benjamin L. Utech
*Assistant Examiner*—George Goudreau
*Attorney, Agent, or Firm*—Burns, Doane, Swecker & Mathis L.L.P.

[57] ABSTRACT

An etchant for chalcogenide glass or oxychalcogenide glass contains an acid and a compound, e.g., an oxidizing agent, which reacts with hydrogen chalcogen to guarantee safe etching of sulfuric glasses in rendering the glass surface smooth and free from surface defects. The etchant is used for an etching method in which a member made of chalcogenide glass or oxychalcogenide glass is dipped in the prepared etchant. The member can make a glass optical member having a surface, substantially free from latent scratch, whose surface roughness difference is one micron meter or less in a length of 0.1 micron meter taken along the surface.

22 Claims, No Drawings

ETCHANT AND METHOD FOR ETCHING CHALCOGENIDE GLASS AND OPTICAL MEMBER HAVING SMOOTH SURFACE

BACKGROUND OF THE INVENTION

1. Field of the Invention

This invention relates to an etchant suitable for etching chalcogenide glass and oxychalcogenide glass, a method for etching chalcogenide glass and oxychalcogenide glass, and a glass optical member produced from this etching.

2. Description of Related Art

Generally, polishing and etching of a glass surface is commonly used to remove a metamorphic or deteriorated layer existing on the surface and foreign objects clinging to the surface. Removal of such a metamorphic layer or foreign objects by polishing, however, may leave latent scratches on the surface, and such latent scratches may unavoidably remain. If foreign objects cling to the glass surface or latent scratches remain on the glass surface, the glass greatly reduces the glass' mechanical strength.

Metal sulfide chalcogenide glasses, because of having high solubility of ionic substances, can be doped with a relatively large amount of light emitting substances. The metal sulfide chalcogenide glasses are, therefore, getting attentions as a material that may replace arsenic-sulfuric glass currently produced as chalcogenide glass fibers having a low solubility of ionic substances. The sulfuric chalcogenide glass, however, tends to have less stable crystallization than the arsenic-sulfuric glass, and the mechanical strength of the sulfuric chalcogenide glass may greatly suffer from foreign objects or latent scratches on the glass surface. When the sulfuric chalcogenide glass is made into a fiber by a drawing method, the glass surface may be crystallized around the foreign objects or latent scratches as nucleuses on the glass surface, and if crystallized once, the glass is hardly made into a fiber. Due to this ground, no example has been known in which the sulfuric chalcogenide glass is successfully made into a fiber by a drawing method, although the sulfuric chalcogenide glass can be doped with a relatively large amount of light emitting substances.

Foreign objects, latent scratches, etc. are generally removed by etching from the glass surface to make non-oxide glass having lesser stability of crystallization, e.g., fluoride glass. For example, U.S. Pat. No. 4,631,114 discloses removal of metamorphic layers, foreign objects, latent scratches on a preform or tube surface by etching with a special etchant over the preform or tube surface.

Necessary properties of the etchant are: first, the etchant will not increase micro undulation on the glass surface after removing the metamorphic layers, foreign objects, and latent scratches on the glass surface; second, the etchant will not promote latent scratches; and third, the etchant will not create any new metaphoric layer. When etching is made using an etchant dissatisfying those first to third conditions, the strength of the fiber may be deteriorated more than prior to the etching.

A chalcogenide glass, in particular, a sulfide glass, if inadvertently dipped in an etchant including an acid, generates poisonous hydrogen sulfide, etc., in accompanied with solution of the glass, and creates risks. Therefore, an etchant should be designed in the light of compositions of the glass as an etching target.

In sum, no etchant has been known so far which satisfies the first to third conditions above and which is designed in consideration of safeness as well.

SUMMARY OF THE INVENTION

It is an object of the invention to provide a novel etchant for etching sulfuric chalcogenide glass with excellent safeness in satisfying the first to third conditions above.

It is another object of the invention to provide a method for safely removing metamorphic layers, foreign objects, and latent scratches on a surface of a sulfuric chalcogenide glass while etching the surface in satisfying the first to third conditions above.

It is yet another object of the invention to provide an optical member made of sulfuric chalcogenide glass having a smooth surface fabricated by the etching method above.

In one form of the invention, the foregoing objects are accomplished by an etchant for etching chalcogenide glass or oxychalcogenide glass comprising an acid and a compound reactive with hydrogen chalcogenide.

According to a preferred embodiment of the invention, the acid is an inorganic acid, and the compound reactive with hydrogen chalcogenide is an oxidizing agent. The acid may have a range of 0.01 to 5 N [normals] while the compound reactive with hydrogen chalcogenide may have a concentration of 0.01 mole per liter or greater. The etchant may further contain a compound having properties suppressing solution speed of at least one cations in the etchant, wherein the cations are those constituting the chalcogenide glass or oxychalcogenide glass. The compound reactive with hydrogen chalcogenide may be a salt, and a cation constituting the salt may have properties suppressing solution speed of at least one cations in the etchant, wherein the cations are those constituting the chalcogenide glass or oxychalcogenide glass. The chalcogenide glass and oxychalcogenide glass contain sulfur as a chalcogen element, and the hydrogen chalcogenide can be hydrogen sulfide.

In another form of the invention, a method for etching chalcogenide glass or oxychalcogenide glass comprises the steps of preparing an etchant containing an acid and a compound reactive with hydrogen chalcogenide and dipping a member made of chalcogenide glass or oxychalcogenide glass in the etchant. The member may be a glass member possibly having latent scratches inflicted by polishing before etching.

In yet another form of the invention, an optical member, made of chalcogenide glass or oxychalcogenide glass, whose surface is substantially free from latent scratches, whereby surface roughness difference is 1 micron meter or less in a length of 0.1 micron meter taken along the surface. Preferably, surface roughness difference is 100 namo meter or less in a length of 0.1 micron meter taken along the surface in cases that the optical member is used as a lens or a prism. In cases that a thin layer is deposited on the optical member, surface roughness difference is preferably 10 namo meter or less in a length of 0.1 micron meter taken along the surface. The optical member may be produced by a method comprising the steps of preparing an etchant containing an acid, and a compound reactive with hydrogen chalcogenide and dipping a member made of chalcogenide glass or oxychalcogenide glass in the etchant.

DETAILED DESCRIPTION OF PREFERRED EMBODIMENTS

An etchant according to the invention contains an acid and a compound reactive with hydrogen chalcogenide. The acid can be either an organic acid or an inorganic acid. As an organic acid, exemplified is, e.g., acetic acid, and as an inorganic acid, exemplified are, e.g., hydrochloric acid, nitric acid, sulfuric acid, fluoric acid. A mixture of above acids can be used. An acid, particularly, an inorganic acid is powerful for solving the chalcogenide glass and oxychalcogenide glass. The concentration of the acid is preferably set in the range of 0.01 to 5 N [normals]. When the concentration is lower than that in the range, the etching speed becomes slow, and a thick hydration layer may be formed on the glass surface. In a case of a preform, the hydration layer may promote surface crystallization when the glass is drawn into a fiber. When the concentration is too high, the etching speed becomes too fast, thereby promoting latent scratches and increasing surface roughness.

As a compound reactive with hydrogen chalcogenide, exemplified is, e.g., a compound producing metallic sulfide insoluble in an oxidizing agent or an acid. As a compound producing metallic sulfide insoluble in an acid, exemplified is, e.g., a compound containing a rhodium (Rh). As oxidizing agents, exemplified are, e.g., chlorates, bromates, iodates, hypochlorites, permanganates, chromates, bichromates, hydrogen peroxides, percarbonates, and mixtures of those. It is to be noted that salts constituting those oxidizing agents are preferably salts highly soluble, such as a sodium salt, a potassium salt, etc. In addition to the above compounds, $La(NO_3)_3$, $La(ClO_3)_3$, $BF_3$, and $Ce(BO_2)_4$, $Sn(BO_2)_4$, etc. as compounds of $Ce^{4+}$, $Sn^{4+}$, and $Pb^{4+}$ are exemplified. Those compounds reactive with hydrogen chalcogenide are appropriate to be solved to make a concentration of 0.01 mole per liter or greater. It is to be noted that the upper limit of the concentration is the saturated solubility, and to form a relatively high concentration, it is preferable to select a compound highly soluble in water.

An oxidizing agent has an effect, by quickly oxidizing the gas, to make harmless a hydrogen sulfide gas that produced when the glass is solved in the acid. It is therefore preferable to add the oxidizing agent more than the equivalent amount in accordance with an amount of the glass removed by etching. If an added amount is too small, sulfur is produced in the solution, thereby possibly increasing surface roughness of the member or item to be etched and generating hydrogen sulfide. An excessive additional amount does not raise such problems.

The etchant according to the invention can further contain a compound having properties suppressing solution speed in the etchant of at least one cations constituting the chalcogenide glass or oxychalcogenide glass. The cations constituting the chalcogenide glass or oxychalcogenide glass can be, as described below, e.g., ions of sodium, gallium, lanthanum, aluminum, etc. The compounds having properties suppressing solution speed of those cations in the etchant are, e.g., water soluble salts capable of enhancing concentration or activity of those cations in the etchant or compounds forming insoluble salts with those cations. As such compounds, exemplified for sodium are, e.g., halides, nitrates, sulfates, borates, phosphates, metaphosphates, uranyl acetates, etc., and for gallium, lanthanum, and aluminum, e.g., halides such as fluorides or the like, nitrates, sulfates, borates, phosphates, and metaphosphates. It is appropriate to use salts containing anions having less reducibility, because those compounds (salts), if containing anions having strong reducibility, may consume the oxidizing agents commonly added.

The compound has an effect to selectively prevent specific ion species from solving out of the glass. Therefore, if with respect to a glass containing a large amount of sodium ions, a compound having properties suppressing solution speed of sodium ions in the etchant is used or if with respect to a glass containing gallium, aluminum, etc., as main components, a compound having properties suppressing solution speed of the gallium and aluminum ions in the etchant is used, those ions would be prevented from solving out of the glass. A proper range of the additional amount of those compounds to the etchant is generally from 0.01 mole per liter to the saturated concentration, though an optimum amount may vary according to glass species and composition ratios.

The compound reactive with hydrogen chalcogen can be a salt. A cation constituting the salt can have properties suppressing solution speed of at least one cations constituting the chalcogenide glass or oxychalcogenide glass in the etchant. As such a compound, exemplified are sodium chlorate, gallium chlorate, aluminum chlorate, sodium bromate, gallium bromate, aluminum bromate, sodium iodate, gallium iodate, aluminum iodate, sodium hypochlorite, gallium hypochlorite, aluminum hypochlorite, sodium permanganate, gallium permanganate, aluminum permanganate, sodium chromate, gallium chromate, aluminum chromate, sodium bichromate, gallium bichromate, aluminum bichromate, sodium hydrogen peroxide, gallium hydrogen peroxide, aluminum hydrogen peroxide, sodium percarbonate, gallium percarbonate, aluminum percarbonate, etc. A proper range of an additional amount of those compounds to the etchant is generally from 0.01 mole per liter to the saturated concentration.

The etchant according to the invention can contain other additives in addition to the above compositions. For example, to control the viscosity of the etchant, viscosity controlling agents such as glycerol, sodium silicate, polyvinyl alcohol, calcium sulfate, tetramethoxysilane, trimethoxysilane, tetraethoxysilane, etc., can be added to the etchant.

According to the invention, the chalcogenide glass and oxychalcogenide glass are glasses containing sulfur as a chalcogen element and particularly contain a sulfide glass having high solubility of ionic substances. Such a sulfide glass is expressed by, e.g., general formula, $A^{3+}-D^{2+}-E^+-S$, wherein A denotes one or more of Ga, Al, and In; D denotes one or more of Cd, Ca, Sr, Ba, Pb, Zn, and Hg; E denotes one or more of Li, Na, K, Ce, Rb, and Tl. More specifically, exemplified are, e.g., chalcogenide glasses of Ga—Na—S, Ga—Na—Cd—S, Ga—Ge—S, Ga—La—S, B—Na—S, Ga—Ge—La—S, Al—La—S, Ge—Na—S, etc. The oxychalcogenide glass has oxygen in addition to the chalcogenide glass and, more specifically, are made of, e.g., Ga—Na—S—O, Ga—La—S—O, Ga—Ge—La—S—O, Al—La—S—O, etc.

When the sulfide glass is etched in use of the etchant according to the invention, the hydrogen chalcogenide generated by reaction of the acid is hydrogen sulfide, and this hydrogen sulfide reacts with "the compound reactive with hydrogen chalcogenide," so that poisonous hydrogen sulfide will not leak out of the process line.

Tables 1A to 5B show combinations of kinds of chalcogenide glasses and oxychalcogenide glasses, as etching targets, and etchants of this invention suitable in accordance with kinds of the respective glasses. The etchants here contain an acid, a compound (oxidizing agent) reactive with hydrogen chalcogenide, and a compound having properties suppressing solution speed of at least one cations constituting the chalcogenide glass or oxychalcogenide glass.

TABLE 1A

Glass: Ga-Na-S, Acid: Hydrochloric Acid or Nitric Acid

|  | Sodium Chlorate | Sodium Bromate | Sodium Iodate | Sodium Hypochlorite |
|---|---|---|---|---|
| Sodium Bromide | Yes | Yes | Yes | Yes |
| Sodium Iodide | Yes | Yes | Yes | Yes |
| Sodium Nitrate | Yes | Yes | Yes | Yes |
| Sodium Sulfate | Yes | Yes | Yes | Yes |
| Sodium Borate | Yes | Yes | Yes | Yes |
| Sodium Orthophosphate | Yes | Yes | Yes | Yes |
| Sodium Metaphosphate | Yes | Yes | Yes | Yes |
| Sodium Bromide + Gallium Chloride | Yes | Yes | Yes | Yes |
| Sodium Iodide + Gallium Chloride | Yes | Yes | Yes | Yes |
| Sodium Nitrate + Gallium Nitrate | Yes | Yes | Yes | Yes |
| Sodium Sulfate + Gallium Sulfate | Yes | Yes | Yes | Yes |

TABLE 1A-continued

Glass: Ga-Na-S, Acid: Hydrochloric Acid or Nitric Acid

|  | Sodium Chlorate | Sodium Bromate | Sodium Iodate | Sodium Hypochlorite |
|---|---|---|---|---|
| Sodium Borate + Gallium Borate | Yes | Yes | Yes | Yes |

TABLE 1B

Glass: Ga-Na-S, Acid: Hydrochloric Acid or Nitric Acid

|  | Potassium Permanganate | Potassium Chromate | Potassium Bichromate | Hydrogen Peroxide | Sodium Percarbonate |
|---|---|---|---|---|---|
| Sodium Bromide | Yes | Yes | Yes | Yes | Yes |
| Sodium Iodide | Yes | Yes | Yes | Yes | Yes |
| Sodium Nitrate | Yes | Yes | Yes | Yes | Yes |
| Sodium Sulfate | Yes | Yes | Yes | Yes | Yes |
| Sodium Borate | Yes | Yes | Yes | Yes | Yes |
| Sodium Orthophosphate | Yes | Yes | Yes | Yes | Yes |
| Sodium Metaphosphate | Yes | Yes | Yes | Yes | Yes |
| Sodium Bromide + Gallium Chloride | Yes | Yes | Yes | Yes | Yes |
| Sodium Iodide + Gallium Chloride | Yes | Yes | Yes | Yes | Yes |
| Sodium Nitrate + Gallium Nitrate | Yes | Yes | Yes | Yes | Yes |
| Sodium Sulfate + Gallium Sulfate | Yes | Yes | Yes | Yes | Yes |
| Sodium Borate + Gallium Borate | Yes | Yes | Yes | Yes | Yes |

Note:
Nitric acid is preferably used for oxidizing agents having relatively strong oxidative ability such as potassium permanganate, potassium chromate, and potassium bichromate.

TABLE 2A

Glass: Ga-Na-S-(O), Acid: Hydrochloric Acid, Nitric Acid, Sulfuric Acid, Fluoric Acid, or Acetic Acid

|  | Sodium Chlorate | Sodium Bromate | Sodium Iodate | Sodium Hypochlorite |
|---|---|---|---|---|
| Sodium Bromide | Yes | Yes | Yes | Yes |
| Sodium Iodide | Yes | Yes | Yes | Yes |
| Sodium Nitrate | Yes | Yes | Yes | Yes |
| Sodium Sulfate | Yes | Yes | Yes | Yes |
| Sodium Borate | Yes | Yes | Yes | Yes |
| Sodium Orthophosphate | Yes | Yes | Yes | Yes |
| Sodium Metaphosphate | Yes | Yes | Yes | Yes |
| Sodium Bromide + Gallium Chloride | Yes | Yes | Yes | Yes |
| Sodium Iodide + Gallium Chloride | Yes | Yes | Yes | Yes |
| Sodium Nitrate + Gallium Nitrate | Yes | Yes | Yes | Yes |
| Sodium Sulfate + Gallium Sulfate | Yes | Yes | Yes | Yes |
| Sodium Borate + Gallium Borate | Yes | Yes | Yes | Yes |

TABLE 2B

Glass: Ga-Na-S-(O), Acid: Hydrochloric Acid, Nitric Acid, Sulfuric Acid, Fluoric Acid, or Acetic Acid

|  | Potassium Permanganate | Potassium Chromate | Potassium Bichromate | Hydrogen Peroxide | Sodium Percarbonate |
|---|---|---|---|---|---|
| Sodium Bromide | Yes | Yes | Yes | Yes | Yes |
| Sodium Iodide | Yes | Yes | Yes | Yes | Yes |
| Sodium Nitrate | Yes | Yes | Yes | Yes | Yes |
| Sodium Sulfate | Yes | Yes | Yes | Yes | Yes |
| Sodium Borate | Yes | Yes | Yes | Yes | Yes |
| Sodium Orthophosphate | Yes | Yes | Yes | Yes | Yes |
| Sodium Metaphosphate | Yes | Yes | Yes | Yes | Yes |
| Sodium Bromide + Gallium Chloride | Yes | Yes | Yes | Yes | Yes |
| Sodium Iodide + Gallium Chloride | Yes | Yes | Yes | Yes | Yes |
| Sodium Nitrate + Gallium Nitrate | Yes | Yes | Yes | Yes | Yes |
| Sodium Sulfate + Gallium Sulfate | Yes | Yes | Yes | Yes | Yes |
| Sodium Borate + Gallium Borate | Yes | Yes | Yes | Yes | Yes |

Note:
Nitric or sulfuric acid is preferably used for oxidizing agents having relatively strong oxidative ability such as potassium permanganate, potassium chromate, and potassium bichromate.

TABLE 3A

Glass: Ga-La-S-(O), Acid: Hydrochloric Acid, Nitric Acid, Sulfuric Acid, or Acetic Acid

|  | Sodium Chlorate | Sodium Bromate | Sodium Iodate | Sodium Hypochlorite |
|---|---|---|---|---|
| Gallium Bromide | Yes | Yes | Yes | Yes |
| Gallium Iodide | Yes | Yes | Yes | Yes |
| Gallium Nitrate | Yes | Yes | Yes | Yes |
| Gallium Sulfate | Yes | Yes | Yes | Yes |
| Gallium Borate | Yes | Yes | Yes | Yes |
| Gallium Orthophosphate | Yes | Yes | Yes | Yes |
| Gallium Metaphosphate | Yes | Yes | Yes | Yes |
| Gallium Bromide + Lanthanum Chloride | Yes | Yes | Yes | Yes |
| Gallium Iodide + Lanthanum Chloride | Yes | Yes | Yes | Yes |
| Gallium Nitrate + Lanthanum Nitrate | Yes | Yes | Yes | Yes |
| Gallium Sulfate + Lanthanum Sulfate | Yes | Yes | Yes | Yes |
| Gallium Borate + Lanthanum Borate | Yes | Yes | Yes | Yes |

TABLE 3B

Glass: Ga-La-S-(O), Acid: Hydrochloric Acid, Nitric Acid, Sulfuric Acid, or Acetic Acid

|  | Potassium Permanganate | Potassium Chromate | Potassium Bichromate | Hydrogen Peroxide | Sodium Percarbonate |
|---|---|---|---|---|---|
| Gallium Bromide | Yes | Yes | Yes | Yes | Yes |
| Gallium Iodide | Yes | Yes | Yes | Yes | Yes |
| Gallium Nitrate | Yes | Yes | Yes | Yes | Yes |
| Gallium Sulfate | Yes | Yes | Yes | Yes | Yes |
| Gallium Borate | Yes | Yes | Yes | Yes | Yes |
| Gallium Orthophosphate | Yes | Yes | Yes | Yes | Yes |

TABLE 3B-continued

Glass: Ga-La-S-(O), Acid: Hydrochloric Acid, Nitric Acid, Sulfuric Acid, or Acetic Acid

|  | Potassium Permanganate | Potassium Chromate | Potassium Bichromate | Hydrogen Peroxide | Sodium Percarbonate |
|---|---|---|---|---|---|
| Gallium Metaphosphate | Yes | Yes | Yes | Yes | Yes |
| Gallium Bromide + Lanthanum Chloride | Yes | Yes | Yes | Yes | Yes |
| Gallium Iodide + Lanthanum Chloride | Yes | Yes | Yes | Yes | Yes |
| Gallium Nitrate + Lanthanum Nitrate | Yes | Yes | Yes | Yes | Yes |
| Gallium Sulfate + Lanthanum Sulfate | Yes | Yes | Yes | Yes | Yes |
| Gallium Borate + Lanthanum Borate | Yes | Yes | Yes | Yes | Yes |

Note:
Nitric or sulfuric acid is preferably used for oxidizing agents having relatively strong oxidative ability such as potassium permanganate, potassium chromate, and potassium bichromate.

TABLE 4A

Glass: Ga-Ge-S-(O), Acid: Fluoric Acid, Hydrochloric Acid, Nitric Acid, Sulfuric Acid, or Acetic Acid

|  | Sodium Chlorate | Sodium Bromate | Sodium Iodate | Sodium Hypochlorite |
|---|---|---|---|---|
| Gallium Bromide | Yes | Yes | Yes | Yes |
| Gallium Iodide | Yes | Yes | Yes | Yes |
| Gallium Nitrate | Yes | Yes | Yes | Yes |
| Gallium Sulfate | Yes | Yes | Yes | Yes |
| Gallium Borate | Yes | Yes | Yes | Yes |
| Gallium Orthophosphate | Yes | Yes | Yes | Yes |
| Gallium Metaphosphate | Yes | Yes | Yes | Yes |
| Gallium Fluoride | Yes | Yes | Yes | Yes |
| Gallium Nitrate + Sodium Fluoride | Yes | Yes | Yes | Yes |

TABLE 4B

Glass: Ga-La-S-(O), Acid: Fluoric Acid, Hydrochloric Acid, Nitric Acid, Sulfuric Acid, or Acetic Acid

|  | Potassium Permanganate | Potassium Chromate | Potassium Bichromate | Hydrogen Peroxide | Sodium Percarbonate |
|---|---|---|---|---|---|
| Gallium Bromide | Yes | Yes | Yes | Yes | Yes |
| Gallium Iodide | Yes | Yes | Yes | Yes | Yes |
| Gallium Nitrate | Yes | Yes | Yes | Yes | Yes |
| Gallium Sulfate | Yes | Yes | Yes | Yes | Yes |
| Gallium Borate | Yes | Yes | Yes | Yes | Yes |
| Gallium Orthophosphate | Yes | Yes | Yes | Yes | Yes |
| Gallium Metaphosphate | Yes | Yes | Yes | Yes | Yes |
| Gallium Fluoride | Yes | Yes | Yes | Yes | Yes |
| Gallium Nitrate + Sodium Fluoride | Yes | Yes | Yes | Yes | Yes |

Note:
Fluoric, nitric or sulfuric acid is preferably used for oxidizing agents having relatively strong oxidative ability such as potassium permanganate, potassium chromate, and potassium bichromate.

TABLE 5A

Glass: Ga-Ge-La-S-(O), Acid: Fluoric Acid, Hydrochloric Acid, Nitric Acid, Sulfuric Acid, or Acetic Acid

|  | Sodium Chlorate | Sodium Bromate | Sodium Iodate | Sodium Hypochlorite |
|---|---|---|---|---|
| Gallium Bromide | Yes | Yes | Yes | Yes |
| Gallium Iodide | Yes | Yes | Yes | Yes |
| Gallium Nitrate | Yes | Yes | Yes | Yes |
| Gallium Sulfate | Yes | Yes | Yes | Yes |
| Gallium Borate | Yes | Yes | Yes | Yes |
| Gallium Orthophosphate | Yes | Yes | Yes | Yes |
| Gallium Metaphosphate | Yes | Yes | Yes | Yes |
| Gallium Fluoride | Yes | Yes | Yes | Yes |
| Gallium Nitrate + Sodium Fluoride | Yes | Yes | Yes | Yes |
| Gallium Nitrate + Lanthanum Nitrate | Yes | Yes | Yes | Yes |
| Gallium Nitrate + Lanthanum Nitrate + Gallium Fluoride | Yes | Yes | Yes | Yes |
| Gallium Borate + Lanthanum Borate + Gallium Fluoride | Yes | Yes | Yes | Yes |

TABLE 5B

Glass: Ga-Ge-La-S-(O), Acid: Fluoric Acid, Hydrochloric Acid, Nitric Acid, Sulfuric Acid, or Acetic Acid

|  | Potassium Permanganate | Potassium Chromate | Potassium Bichromate | Hydrogen Peroxide | Sodium Percarbonate |
|---|---|---|---|---|---|
| Gallium Bromide | Yes | Yes | Yes | Yes | Yes |
| Gallium Iodide | Yes | Yes | Yes | Yes | Yes |
| Gallium Nitrate | Yes | Yes | Yes | Yes | Yes |
| Gallium Sulfate | Yes | Yes | Yes | Yes | Yes |
| Gallium Borate | Yes | Yes | Yes | Yes | Yes |
| Gallium Orthophosphate | Yes | Yes | Yes | Yes | Yes |
| Gallium Metaphosphate | Yes | Yes | Yes | Yes | Yes |
| Gallium Fluoride | Yes | Yes | Yes | Yes | Yes |
| Gallium Nitrate + Sodium Fluoride | Yes | Yes | Yes | Yes | Yes |
| Gallium Nitrate + Lanthanum Nitrate | Yes | Yes | Yes | Yes | Yes |
| Gallium Nitrate + Lanthanum Nitrate + Gallium Fluoride | Yes | Yes | Yes | Yes | Yes |
| Gallium Borate + Lanthanum Borate + Gallium Fluoride | Yes | Yes | Yes | Yes | Yes |

This invention includes a method for etching a glass member in which a member made of chalcogenide glass or oxychalcogenide glass is dipped in the etchant above. The glass member can be dipped in the etchant having liquid temperature of 1 to 50 Celsius degrees for 0.1 to 3600 seconds. The temperature and time for dipping can be selected in the light of the compositions of the etchant and the glass compositions constituting the glass member. After etching, excessive etchant is completely removed from the surface by rinsing the surface with organic solvents such as alcohols or ketones after rinsing with, e.g., pure water, or by directly rinsing the surface with organic solvents such as alcohols or ketones, and then the member is dried in dry air or inert gas. The etching method according to the invention can remove latent scratches even where the glass member has latent scratches on the glass surface due to polishing.

According to the etching method of the invention, a glass optical member can be obtained in which the surface of the member is substantially free from latent scratches and in which a surface roughness difference is 1 micron meter or less in a length of 0.1 micron meter taken along the surface. The optical member according to the invention can be, e.g., a laser medium, an optical amplifier medium, a lens, an optical window, etc.

EXAMPLES

Now, this invention will be described based on Examples.

Example 1

An etchant according to the invention was prepared by solving sodium chloride of 550 gram and potassium chlorate of 20 gram in this order in one liter hydrochloric acid of 0.1 mole per liter. A sulfuric chalcogenide glass plate (20 mm×20 mm×2 mm) having a composition of $Ga_2S_3$, 67 mol % and $Na_2S$, 33 mol % was dipped in the etchant while rotated, and then etched at the room temperature (20 Celsius degrees) for five minutes. The glass plate was subsequently rinsed with water of zero Celsius degree for about one second and washed in acetone for about one minute in applying ultrasound, and then dried in a dry air.

Although foreign objects of about ten pieces per square millimeter (or 1000 pieces per square centimeter) due to crystallization were observed on the surface under an observation using an optical microscope prior to the etching, no foreign object was observed on the glass surface after the etching. When the glass plate was etched solely with hydrochloric acid of 0.1 mole per liter, an interference film assuming blue color was produced on the glass surface, and an occurrence of a composition shift was apparently observed on the glass surface. In contrast, no interference film was observed when the etchant according to this Example was used. When the surface etched with the etchant according to this Example was observed with a scanning electron microscope, the surface was very smooth and had surface roughness difference of one micron meter or less in a length of 0.1 micron meter taken along the surface. After the glass was dipped in an acid, the glass surface was observed with an optical microscope. The observer found no meshed lines that may occur due to latent scratches on the glass surface. Some crack assuming an interference color due to extension of meshed lines would generally have observed if the surface has latent scratches, but no crack was observed on the glass according to this Example.

Example 2

An etchant according to the invention was prepared by solving sodium chloride of 510 gram and sodium chlorate of 50 gram in this order in one liter hydrochloric acid of 0.05 mole per liter. An anhydrously polished sulfuric chalcogenide glass plate (20 mm×20 mm×1 mm) having a composition of $Ga_2S_3$, 65 mol % and $Na_2S$, 35 mol % was dipped in the etchant while rotated, and then etched at the room temperature (20 Celsius degrees) for five minutes. The glass plate was subsequently rinsed with 99.5 percent ethanol at 20 Celsius degrees for about one second in applying ultrasound and washed in acetone for about one minute, and then dried in a dry air.

When the anhydrously polished glass plate was etched solely with hydrochloric acid of 0.1 mole per liter, an interference film assuming blue color was produced on the glass surface, and deeply extended latent scratches created by polishing were observed. To the contrary, with the etchant according to the Example, no interference film was observed, and latent scratches made wider and shallower were observed. Neither foreign object due to crystallization or new latent scratch was observed on the glass surface etched using the etchant according to this Example. As a result of observation using a scanning electron microscope in the same manner as Example 1, the glass plate was found to have surface roughness difference of one micron meter or less in a length of 0.1 micron meter taken along the surface and to have a very smooth surface.

Example 3

An etchant according to the invention was prepared by solving metallic gallium of 140 gram and potassium permanganate of 5 gram in this order in one liter nitric acid of three mole per liter. An anhydrously polished sulfuric chalcogenide glass plate (10 mm×10 mm×1.5 mm) having a composition of $Ga_2S_3$, 70 mol % and $La_2S_3$, 30 mol % was dipped in the etchant while rotated, and then etched at the room temperature (20 Celsius degrees) for five minutes. The glass plate was subsequently rinsed with 99.5 percent ethanol at 20 Celsius degrees for about one second in applying ultrasound and washed in acetone for about one minute, and then dried in a dry air.

When the polished glass plate was etched solely with nitric acid of one mole per liter, an interference film assuming blue color was produced on the glass surface. To the contrary, with the etchant according to the Example, no interference film was observed. Neither foreign object due to crystallization or latent scratch was observed on the glass surface etched using the etchant according to this Example. As a result of observation using a scanning electron microscope in the same manner as Example 1, the glass plate was found to have surface roughness difference of one micron meter or less in a length of 0.1 micron meter taken along the surface and to have a very smooth surface.

Example 4

An etchant according to the invention was prepared by solving metallic gallium of 70 gram in a half liter nitric acid of 2.5 mole per liter, subsequently mixing a half liter hydrofluoric acid of 1 mole per liter to the solution, and then solving sodium chlorate of 25 gram. An sulfuric chalcogenide glass plate (5 mm×5 mm×1 mm) having a composition of Ga 5 mol %, Ge 25 mol %, and S 70 mol % was dipped in the etchant while rotated, and then etched at the room temperature (20 Celsius degrees) for five minutes. The glass plate was subsequently rinsed with water of zero Celsius degree for about one second and washed in acetone for about one minute in applying ultrasound, and then dried in a dry air.

No interference film was observed on the glass surface after etching. Neither foreign object due to crystallization or latent scratch was observed on the glass surface etched using the etchant according to this Example. As a result of observation using a scanning electron microscope in the same manner as Example 1, the glass plate was found to have surface roughness difference of one micron meter or less in a length of 0.1 micron meter taken along the surface and to have a very smooth surface.

Example 5

An etchant according to the invention was prepared by solving a glycerol of 50 milliliter in the etchant of Example 1 (sodium chloride of 550 gram and potassium chlorate of 20 gram were solved in this order in one liter hydrochloric acid of 0.1 mole per liter). This etchant was a little more viscous than the etchant of Example 1. A glass plate was etched using this etchant in the same manner as Example 1. The obtained glass plate did not show any interference film under an optical microscopic observation and did show a very smooth surface under a scanning electron microscopic observation. The obtained glass plate was found to have surface roughness difference of one micron meter or less in a length of 0.1 micron meter taken along the surface.

An etchant mixed with sodium silicate of 10 milliliter in lieu of the glycerol also brought substantially the same result.

Example 6

An etchant according to the invention was prepared by solving sodium chloride of 550 gram and potassium chlorate of 20 gram in this order in one liter hydrochloric acid of 0.1 mole per liter. An oxychalcogenide glass plate (20 mm×20 mm×2 mm) having a composition of $Ga_2S_3$, 64 mol %, $Ga_2O_3$, 3 mol %, and $Na_2S$, 33 mol % was dipped in the etchant while rotated, and then etched at the room temperature (20 Celsius degrees) for five minutes. The glass plate was subsequently rinsed with water of zero Celsius degree for about one second and washed in acetone for about one minute in applying ultrasound, and then dried in a dry air.

Although foreign objects of about ten pieces per square millimeter (or 1000 pieces per square centimeter) due to crystallization were observed on the surface under an observation using an optical microscope prior to the etching, no foreign object was observed on the glass surface after the etching. When the glass plate was etched solely with hydrochloric acid of 0.1 mole per liter, an interference film assuming blue color was produced on the glass surface, and an occurrence of a composition shift was apparently observed on the glass surface. In contrast, no interference film was observed when the etchant according to this Example was used. When the surface etched with the etchant according to this Example was observed with a scanning electron microscope, the surface was very smooth and had surface roughness difference of one micron meter or less in a length of 0.1 micron meter taken along the surface. After the glass was dipped in an acid, the glass surface was observed with an optical microscope. The observer found no meshed lines that may occur due to latent scratches on the glass surface. Some crack assuming an interference color due to extension of meshed lines would generally have observed if the surface has latent scratches, but no crack was observed on the glass according to this Example.

Example 7

An etchant according to the invention was prepared by solving sodium chloride of 550 gram and potassium chlorate of 20 gram in this order in one liter hydrochloric acid of 0.1 mole per liter. A sulfuric chalcogenide glass plate (20 mm×20 mm×2 mm) having a composition of $Ga_2S_3$, 64 mol %, $Na_2S$, 32 mol %, and CdS 4 mol % was dipped in the etchant while rotated, and then etched at the room temperature (20 Celsius degrees) for five minutes. The glass plate was subsequently rinsed with water of zero Celsius degree for about one second and washed in acetone for about one minute in applying ultrasound, and then dried in a dry air.

Although foreign objects of about ten pieces per square millimeter (or 1000 pieces per square centimeter) due to crystallization were observed on the surface under an observation using an optical microscope prior to the etching, no foreign object was observed on the glass surface after the etching. When the glass plate was etched solely with hydrochloric acid of 0.1 mole per liter, an interference film assuming blue color was produced on the glass surface, and an occurrence of a composition shift was apparently observed on the glass surface. In contrast, no interference film was observed when the etchant according to this Example was used. When the surface etched with the etchant according to this Example was observed with a scanning electron microscope, the surface was very smooth and had surface roughness difference of one micron meter or less in a length of 0.1 micron meter taken along the surface. After the glass was dipped in an acid, the glass surface was observed with an optical microscope. The observer found no meshed lines that may occur due to latent scratches on the glass surface. Some crack assuming an interference color due to extension of meshed lines would generally have observed if the surface has latent scratches, but no crack was observed on the glass according to this Example.

Example 8

An etchant according to the invention was prepared by solving sodium chloride of 550 gram and potassium chlorate of 20 gram in this order in one liter hydrochloric acid of 0.1 mole per liter. A sulfuric chalcogenide glass lens (with diameter of 20 millimeter) having a composition of $Ga_2S_3$, 67 mol %, and $Na_2S$, 33 mol % was dipped in the etchant while rotated, and then etched at the room temperature (20 Celsius degrees) for five minutes. The glass plate was subsequently rinsed with water of zero Celsius degree for about one second and washed in acetone for about one minute in applying ultrasound, and then dried in a dry air.

Although foreign objects of about ten pieces per square millimeter (or 1000 pieces per square centimeter) due to crystallization were observed on the surface under an observation using an optical microscope prior to the etching, no foreign object was observed on the glass surface after the etching. When the glass plate was etched solely with hydrochloric acid of 0.1 mole per liter, an interference film assuming blue color was produced on the glass surface, and an occurrence of a composition shift was apparently observed on the glass surface. In contrast, no interference film was observed when the etchant according to this Example was used. When the surface etched with the etchant according to this Example was observed with a scanning electron microscope, the surface was very smooth and had surface roughness difference of one micron meter or less in a length of 0.1 micron meter taken along the surface. After the glass was dipped in an acid, the glass surface was observed with an optical microscope. The observer found no meshed lines that may occur due to latent scratches on the glass surface. Some crack assuming an interference color due to extension of meshed lines would generally have observed if the surface has latent scratches, but no crack was observed on the glass according to this Example.

This invention can provide the etchant safely usable even for sulfuric chalcogenide in satisfying conditions of: first, not increasing micro undulations on the glass surface after removal of metamorphic layers, foreign objects, and latent scratches; second, not promoting any latent scratch; and third, not producing any new metamorphic layer. This invention can also provide a method for safely removing metamorphic layers, foreign objects, and latent scratches from the glass surface of the sulfuric chalcogenide glass in satisfying the first to third conditions.

This invention can provide an optical member made of sulfuric chalcogenide glass having a smooth surface, and this member makes a glass optical member having excellent surface characteristics, strong mechanical strength, and high reliability even used for a long period, such as a laser medium, an optical amplifier medium, a lens, an optical window, etc. According to the invention, with respect to chalcogenide glasses or oxychalcogenide glasses, particularly, sulfuric glasses having a high solubility in ionic substances, surface defects (crystallization, foreign objects, latent scratches) or the like can be removed or made harmless, so that a glass member having high mechanical strength, high reliability, and excellent surface characteristics, can be fabricated. Since the etchant is added with the oxidizing agent, safe etching work can be performed at that time using inexpensive facilities without generating any poisonous gas such as hydrogen sulfide or the like.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but the be defined claims set forth below.

What is claimed is:

1. A method for etching chalcogenide glass or oxychalcogenide glass, comprising the steps of:
preparing an etchant containing an acid, and a compound reactive with hydrogen chalcogenide; and
dipping a member made of chalcogenide glass or oxychalcogenide glass in the etchant,
with the chalcogenide glass and oxychalcogenide glass containing at least two cations, wherein the glass is represented by the formula $A^{3+}$—$D^{2+}$—$E^{+}$—S, wherein A, D and E respectively denotes a cation and the oxychalcogenide glass additionally comprises oxygen, and with the etchant comprising a compound having properties controlling dissolution speed in the etchant of at least one of the cations constituting the chalcogenide glass or oxychalcogenide glass.

2. The method according to claim 1, wherein the member dipped in the etchant is a glass member having latent scratches inflicted by polishing.

3. The method according to claim 1, wherein A denotes one or more of Ga, Al, and In; D denotes one or more of Cd, Ca, Sr, Ba, Pb, Zn, and Hg; E denotes one or more of Li, Na, K, Ce, Rb, and Tl; and the oxychalcogenide glass additionally comprises oxygen.

4. The method according to claim 1, wherein the acid is an inorganic acid, and the compound reactive with hydrogen chalcogenide is an oxidizing agent.

5. The method according to claim 1, wherein the acid has a concentration in the range of from 0.01 to 5 N, and the compound reactive with hydrogen chalcogenide has a concentration of 0.1 mole per liter or greater.

6. The method according to claim 1, wherein the chalcogenide glass and oxychalcogenide glass contains sulfur as a chalcogen element, and the hydrogen chalcogenide is hydrogen sulfide.

7. The method according to claim 1, wherein the dipping provides an optical member whose surface is substantially free from latent scratches.

8. A method for etching chalcogenide glass or oxychalcogenide glass, comprising the steps of:
preparing an etchant containing an acid, and a compound reactive with hydrogen chalcogenide; and
dipping a member made of chalcogenide glass or oxychalcogenide glass in the etchant,
with the chalcogenide glass and oxychalcogenide glass containing at least two cations, wherein the glass is represented by the formula $A^{3+}$—$D^{2+}$—$E^{+}$—S, wherein A, D and E respectively denotes a cation and the oxychalcogenide glass additionally comprises oxygen, and with the compound reactive with hydrogen chalcogenide being a salt, and the salt is comprised of a cation having properties for controlling the dissolution speed in the etchant of at least one of the cations constituting the chalcogenide glass or oxychalcogenide glass.

9. The method according to claim 8, wherein the member dipped in the etchant is a glass member having latent scratches inflicted by polishing.

10. The method according to claim 8, wherein A denotes one or more of Ga, Al, and In; D denotes one or more of Cd, Ca, Sr, Ba, Pb, Zn, and Hg; E denotes one or more of Li, Na, K, Ce, Rb, Tl; and the oxychalcogenide glass additionally comprises oxygen.

11. The method according to claim 8, wherein the acid is an inorganic acid, and the compound reactive with hydrogen chalcogenide is an oxidizing agent.

12. The method according to claim 8, wherein the acid has a concentration in the range of from 0.01 to 5 N, and the compound reactive with hydrogen chalcogenide has a concentration of 0.1 mole per liter or greater.

13. The method according to claim 8, wherein the chalcogenide glass and oxychalcogenide glass contains sulfur as a chalcogen element, and the hydrogen chalcogenide is hydrogen sulfide.

14. The method according to claim 8, wherein the dipping provides an optical member whose surface is substantially free from latent scratches.

15. A method for etching chalcogenide glass or oxychalcogenide glass, comprising the steps of:
preparing an etchant containing an acid, and a compound reactive with hydrogen chalcogenide; and
dipping a member made of chalcogenide glass or oxychalcogenide glass in the etchant,
with the chalcogenide glass and oxychalcogenide glass containing at least two cations, and with the etchant comprising a compound containing at least one of said at least two cations.

16. The method according to claim 15, wherein said compound containing at least one of said at least two cations has properties controlling dissolution speed in the etchant of at least one of the cations constituting the chalcogenide glass or oxychalcogenide glass.

17. The method according to claim 15, wherein the dipping provides an optical member whose surface is substantially free from latent scratches.

18. A method for etching chalcogenide glass or oxychalcogenide glass, comprising the steps of:
preparing an etchant containing an acid, and a compound reactive with hydrogen chalcogenide; and dipping a member made of chalcogenide glass or oxychalcogenide glass in the etchant,
with the chalcogenide glass and oxychalcogenide glass containing at least two cations, and with the compound reactive with hydrogen chalcogenide being a salt, and the salt is comprised of at least one of said at least two cations.

19. The method according to claim 18, wherein said at least one of said at least two cations has properties controlling dissolution speed in the etchant of at least one of the cations constituting the chalcogenide glass or oxychalcogenide glass.

20. The method according to claim 18, wherein the dipping provides an optical member whose surface is substantially free from latent scratches.

21. A method for etching chalcogenide glass or oxychalcogenide glass, comprising the steps of:

preparing an etchant containing an acid, and a compound reactive with hydrogen chalcogenide; and dipping a member made of chalcogenide glass or oxychalcogenide glass in the etchant, wherein the glass is selected from Ga—Na—S, Ga—Ge—S, Ga—La—S, B—Na—S, Ga—Ge—La—S, Al—La—S, Ge—Na—S, Ga—Na—S—O, Ga—La—S—O, Ga—Ge—La—S—O and Al—La—S—O, with the etchant comprising a compound having properties controlling dissolution speed in the etchant of at least one of the cations constituting the chalcogenide glass or oxychalcogenide glass.

22. A method for etching chalcogenide glass or oxychalcogenide glass, comprising the steps of:

preparing an etchant containing an acid, and a compound reactive with hydrogen chalcogenide; and dipping a member made of chalcogenide glass or oxychalcogenide glass in the etchant, wherein the glass is selected from Ga—Na—S, Ga—Ge—S, Ga—La—S, B—Na—S, Ga—Ge—La—S, Al—La—S, Ge—Na—S, Ga—Na—S—O, Ga—La—S—O, Ga—Ge—La—S—O and Al—La—S—O, with the compound reactive with hydrogen chalcogenide being a salt, and the salt is comprised of a cation having properties for controlling the dissolution speed in the etchant of at least one of the cations constituting the chalcogenide glass or oxychalcogenide glass.

* * * * *